US012656829B2

(12) United States Patent
Delaporte

(10) Patent No.: US 12,656,829 B2
(45) Date of Patent: *Jun. 16, 2026

(54) GIMBAL STABILIZATION ATTACHMENT DEVICE

(71) Applicant: Lepton Computing LLC, Brooklyn, NY (US)

(72) Inventor: Stephen E. Delaporte, Brooklyn, NY (US)

(73) Assignee: Lepton Computing LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/797,103

(22) Filed: Aug. 7, 2024

(65) Prior Publication Data

US 2024/0393836 A1 Nov. 28, 2024

Related U.S. Application Data

(63) Continuation-in-part of application No. 17/521,844, filed on Nov. 8, 2021, now Pat. No. 12,085,988.

(60) Provisional application No. 63/111,046, filed on Nov. 8, 2020.

(51) Int. Cl.
*G06F 1/16* (2006.01)

(52) U.S. Cl.
CPC .......... *G06F 1/1652* (2013.01); *G06F 1/1643* (2013.01)

(58) Field of Classification Search
CPC ..... G06F 1/1652; G06F 1/1641; G06F 1/1681
See application file for complete search history.

(56) References Cited

U.S. PATENT DOCUMENTS

| | | | |
|---|---|---|---|
| 12,085,988 B2* | 9/2024 | Delaporte | G06F 3/0412 |
| 2020/0192423 A1 | 6/2020 | Hsu et al. | |
| 2021/0405708 A1* | 12/2021 | Wang | G06F 1/1616 |
| 2022/0019266 A1 | 1/2022 | Park et al. | |
| 2022/0066724 A1 | 3/2022 | Moon et al. | |
| 2022/0113763 A1 | 4/2022 | Kim et al. | |
| 2022/0214852 A1* | 7/2022 | Kim | G06F 1/3265 |

* cited by examiner

*Primary Examiner* — James Wu
(74) *Attorney, Agent, or Firm* — Shore IP Group, PLLC; Sean R. Wilsusen

(57) ABSTRACT

An apparatus is provided that includes a flexible touch-sensitive display composed of a first flexible touch-sensitive display portion attached to a first structural support segment and a second flexible touch-sensitive display portion attached to a second structural support segment. The flexible touch-sensitive display further includes having a partially expanded state. The flexible touch-sensitive display further includes having a fully expanded state. A gimbal stabilization system is configured to be manually attachable to the first structural support segment and the second structural support segment to automatically rotate the first structural support segment using an actuator such that the first structural support segment can remain at the same angle relative to the ground plane, which can include a viewable displayed content position if the first flexible touch-screen display portion is facing approximately parallel or perpendicular to the ground plane. While the second structural support segment is free to rotate at different angles.

7 Claims, 2 Drawing Sheets

GIMBAL STABILIZATION ATTACHMENT DEVICE

CROSS REFERENCE TO RELATED APPLICATIONS

This application is a continuation of U.S. patent application Ser. No. 17/521,844 filed Nov. 8, 2021, which issued as U.S. Pat. No. 12,085,988 on Sep. 10, 2024. This application claims the benefit of U.S. Provisional Patent Application No. 63/111,046, filed on Nov. 8, 2020, which are incorporated in their entirety herein by reference.

FIELD OF THE INVENTION

The present invention relates generally to computing devices, and more particularly, to a computing device with a touch screen display that can be folded from a compact state to an expanded state.

BACKGROUND OF THE INVENTION

The use of handheld computing devices today has been significantly enabled by a number of advancements in electronics, including the miniaturization of components, an increase in processing speeds, improved memory capacity, and the optimization of battery efficiency. Advancements in touch screen display technology have also enabled interfaces to become more adaptable and intuitive to use on a small scale. Because of these enormous improvements over the last decade, the differences in the performance between handheld computing devices, such as mobile phones, and larger computing devices, have become increasingly subtle.

One of the great difficulties in using a small-scale touch screen device, however, is in the fact that it can often be cumbersome to physically interact with. This is especially apparent when selecting and manipulating features and inputting text, which can sometimes be imprecise for a user. In such handheld computing devices as a touch screen mobile phone, the limited size of the display can also significantly reduce the viewing capacity while watching videos, using graphic intensive applications, and reading text. The rigid nature of a standard touch screen display can also limit the portability of a device when its form factor is in the larger size range for a phone, or at the scale of a tablet, which makes folding a desirable feature. Additionally, because a foldable device fundamentally has a hinge mechanism built in, when taking pictures or videos with the device, the hinge is not optimized to accommodate stabilizing the position of device during these kinds of applications or others where the device may need to constantly be repositioned to provide steady viewing of content shown on the display.

There is therefore a need for touch screen display devices that can be adjusted in size without sacrificing the convenience of being small and handheld. There is also a need for a gimbal stabilization system that can automatically rotate one or both segments of the device such that a first device segment can maintain the same position along a defined axis in space, while a second device segment may be free to rotate independent of the first device segment.

SUMMARY OF EMBODIMENTS OF THE INVENTION

A foldable touch screen display device made up of flexible or tiled display segments that can be folded from a compact state to an expanded state which also includes a gimbal stabilization system. The form factor of the compact state is roughly the size of a typical handheld phone or smaller. The form factor of the expanded state is roughly the size of a larger phone or tablet computer, which may also include the mechanical functionality of a laptop. The device form factor may also be a flip phone configuration. Both folded states may include an integrated speaker and microphone. The gimbal stabilization system can automatically rotate one or both display segments and their related cameras using an actuator such that at least one display segment can remain in the same position independent of the movement of the other display segment. The device may further include sensors to indicate the required position of at least one of the display segments and accelerometers, actuators, and encoders to active the gimbal function. In one embodiment, a module attached to, situated within, or otherwise associated with at least one segment of the flexible display or rigid display may contain all or substantially all processing and memory, along with a communications system, which may be used in any folded state.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Figure 1:
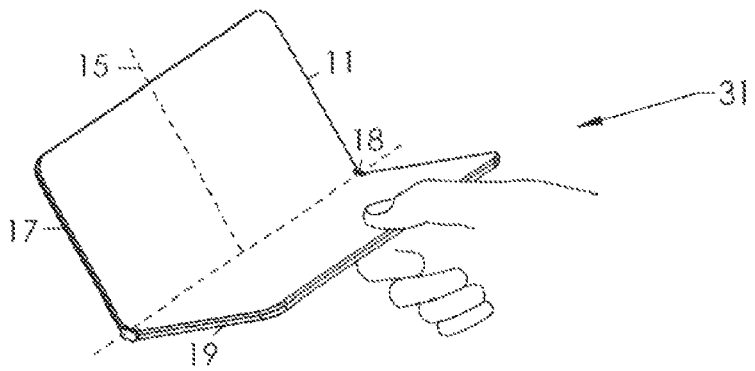
FIG. 1 is a perspective view of a foldable computing device shown in three separate positions where one segment is being rotated freely, while the other remains fixed along the same axis.
Figure 1:
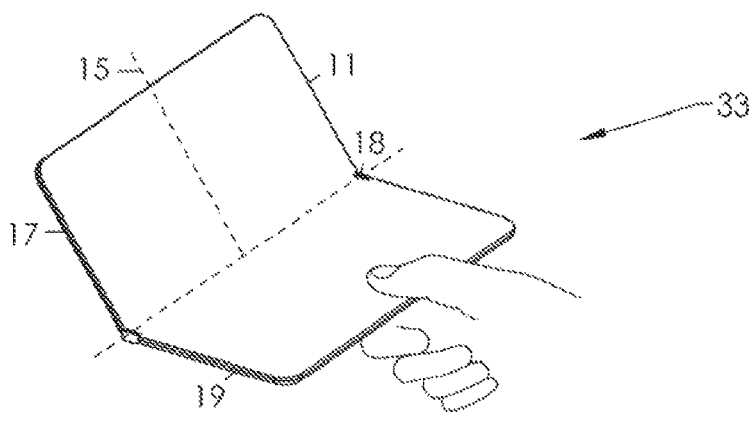
Figure 1:
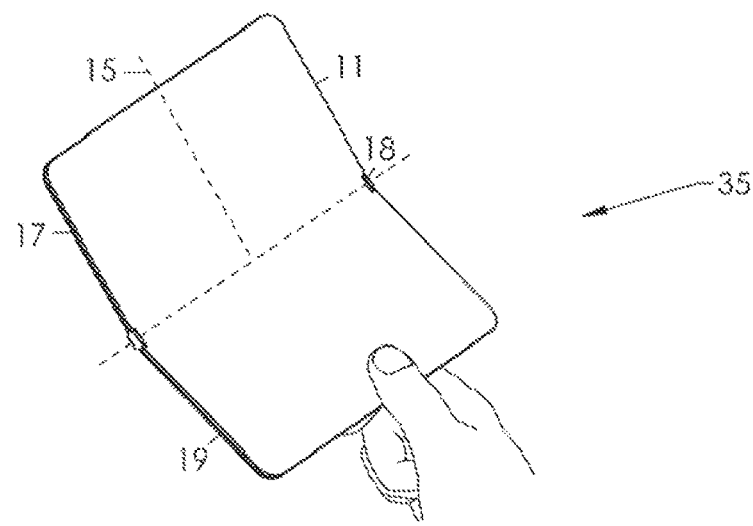

In accordance with the exemplary embodiment shown in FIG. 1, a foldable computing device 11 is illustrated where display segment 19 is held by the hand of a user such that it is rotated freely starting from position 31, where the edge of held segment 19 is angled upward. Then from there, held segment 19 is rotated to the second position 33, where it is angled parallel to the ground, and from there it is then rotated to the third position 35, where the same edge of held segment 19 is repositioned so that it is pointing towards the ground. The second display segment 17 is shown fixed along the axis 15 in each of the positions 31, 33, and 35. The fixed position of display segment 17 is a result of the internal gimbal stabilization system constantly rotating the segment along the same access independent of the position of the other display segment 19 which will be elaborated on in FIG. 2. The different positions shown in FIG. 1 also emphasizes how having the flexibility to hold one segment in various positions while the other segment remains stable, can give the user the ability to view content on the display while moving, such as if the user is walking, or for taking pictures or videos. This is especially useful if the user wants to have the flexibility to move into different positions while keeping the camera that is embedded within the segment continuously fixed along the same access.

Figure 2:
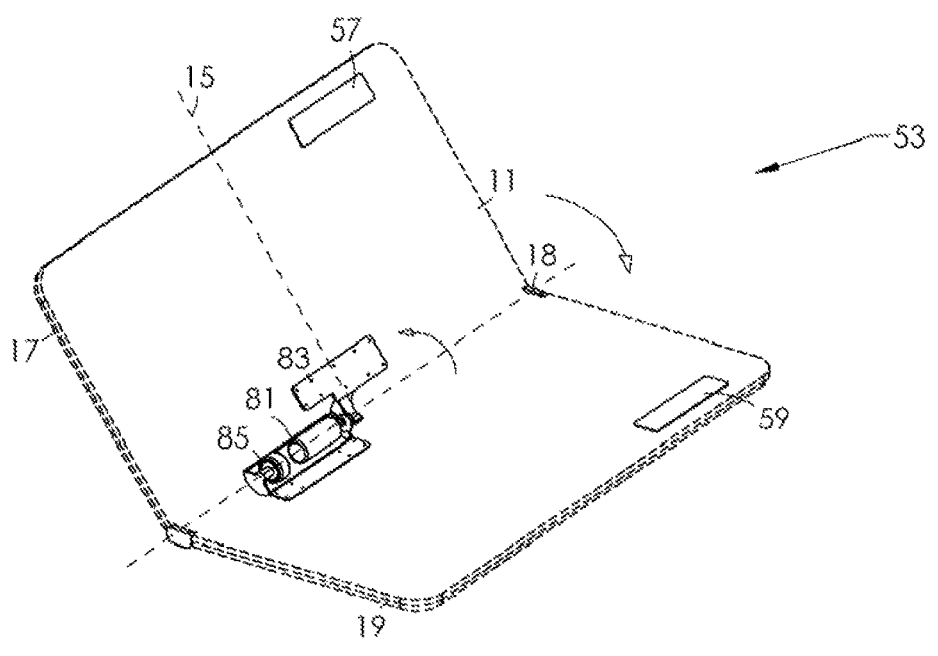
FIG. 2 is a perspective view of the foldable computing device shown in two separate positions enlarged from FIG. 1 to highlight the internal gimbal drive mechanism which is made up of an actuator and an encoder.
Figure 2:
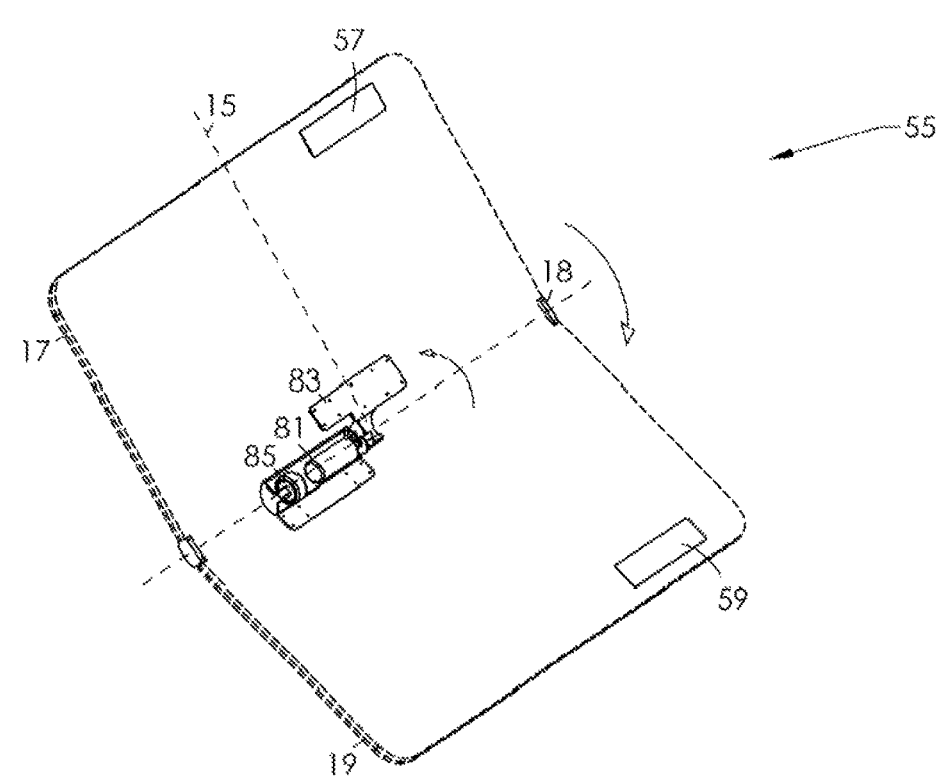

FIG. 2 is a perspective view of the foldable computing device shown in two separate positions 53 and 55 enlarged from FIG. 1 to highlight the internal gimbal stabilization drive mechanism which is made up of an actuator or motor 81, to drive the segments into the desired position through rotating them along the center hinge 18, which is situated between each of the display segments 17 and 19, which also includes an encoder 85, to ensure that the position accuracy is correct, and a drive plate 83 that is coupled to at least one of the display segments, in this case segment 17. Integrated gears will also help to provide enough torque so that the miniature actuator can force the segment into the various positions. Sensor modules 57 and 59 can be included on each separate segment. Each of these sensor modules may include an accelerometer to assist with the gimbal stabilization as they can determine the position of each segment in space and relative to each other. Other sensors that might be included to enhance gimbal stabilization function are IR sensors, Sonar sensors, and LiDAR sensors. Encoder 85 can also help in determining the exact position of each segment relative to each other along with data taken in real time from the accelerometers. It should be noted that the angle of the display segment can be defined by a point of interest captured by the camera of the device or by the user manually moving the display segment to a desired angle. It is also important to consider that the whole gimbal drive mechanism could be produced as a standalone device that gets attached to the back side of the foldable mobile device to provide the same functionality. This gimbal stabilization system could also be used to actuate motion through the hinge mechanism so that the display segment corresponds to motions shown from the segment's displayed content, such as the motion of a face being displayed looking up or down so that the display segment rotates to mimic the same motion shown on the display.

While certain features of the invention have been illustrated and described herein, many modifications, substitutions, changes, and equivalents will now occur to those of ordinary skill in the art. It is, therefore, to be understood that the appended claims are intended to cover all such modifications and changes that fall within the true spirit of the invention.

The invention claimed is:

1. An apparatus comprising:
(a) a flexible touch-sensitive display composed of a first flexible touch-sensitive display portion and a second flexible touch-sensitive display portion; wherein:
(1) the first flexible touch-sensitive display portion is attached to a first structural support segment;
(2) the second flexible touch-sensitive display portion is attached to a second structural support segment;
(3) the flexible touch-sensitive display further comprises having a fully folded state;
(4) the flexible touch-sensitive display further comprises having a partially expanded state;
(5) the flexible touch-sensitive display further comprises having a fully expanded state;
(b) an external gimbal stabilization system attached to the first structural support segment and the second structural support segment configured to automatically rotate the first structural support segment using an actuator such that the first structural support segment can remain at the same angle relative to a ground plane; which can include a viewable displayed content position if the first flexible touch-screen display portion is facing at any angle between an approximately parallel position and an approximately perpendicular position to the ground plane; while the second structural support segment is free to rotate at different angles when the second structural support segment is held by at least one of a user's hands to physically support the full apparatus in the air while the first structural support segment remains unsupported by the at least one of the user's hands.

2. The apparatus of claim 1 wherein:
the gimbal stabilization system and the angle of the first structural support segment is established based upon a defined point of interest captured by a camera of the apparatus.

3. The apparatus of claim 1 wherein:
the gimbal stabilization system and the angle of the first structural support segment is established based upon the user manually angling the first structural support segment to a desired position such that the first structural support segment is then continuously fixed at that defined angle relative to the ground plane.

4. The apparatus of claim 1 wherein:
the gimbal stabilization system includes an encoder coupled to the actuator for accurate position feedback.

5. The apparatus of claim 1 wherein:
the gimbal stabilization system includes at least one accelerometer to detect the position of the structural support segments relative to each other and the ground plane.

6. The apparatus of claim 1 wherein:
the gimbal stabilization system actuates the angle of the first structural support segment based upon the position of an object shown on the flexible touch-sensitive display.

7. The apparatus of claim 1 wherein:
the fully folded state comprises a fully folded angle between the first flexible touch-sensitive display portion and the second flexible touch-sensitive display portion that is less than 10 degrees; and the fully expanded state comprises a fully expanded angle between the first flexible touch-sensitive display portion and the second flexible touch-sensitive display portion that is between 170 and 190 degrees; and the partially expanded state comprises an angle that falls between the fully folded state and the fully expanded state.

\* \* \* \* \*